United States Patent [19]
Wang

[11] Patent Number: 6,157,738
[45] Date of Patent: *Dec. 5, 2000

[54] SYSTEM FOR EXTRACTING ATTACHED TEXT

[75] Inventor: Shin-Ywan Wang, Tustin, Calif.

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/664,675

[22] Filed: Jun. 17, 1996

[51] Int. Cl.$^7$ .................................................. G06K 9/48
[52] U.S. Cl. ........................................... 382/199; 382/198
[58] Field of Search .................................... 382/176, 180, 382/199, 204, 226, 289, 290; 358/453, 462, 464; H04N 1/387, 1/40

[56] References Cited

U.S. PATENT DOCUMENTS

| | | | |
|---|---|---|---|
| 4,377,803 | 3/1983 | Lotspiech et al. ........................... | 382/9 |
| 4,926,490 | 5/1990 | Mano ....................................... | 382/177 |
| 5,588,072 | 12/1996 | Wang ....................................... | 382/176 |
| 5,848,186 | 12/1998 | Wang et al. ............................. | 382/176 |

OTHER PUBLICATIONS

R. G. Casey, et al., "Intelligent Forms Processing", IBM Systems Journal, vol. 29, No. 3, 1990, pp. 435–450.

O. Hori, et al., "Table–Form Structure Analysis Based on Box–Driven Reasoning", IEICE Trans. Inf. & Syst., vol. E79–D, No. 5, May 5, 1995, pp. 542–547.

O. Iwaki, et al., "A Segmentation Method Based on Office Document Hierarchical Structure", Proceedings of the 1987 Institute of Electrical and Electronics Engineers International Conference on Systems, Man, and Cybernetics, vol. 2, Oct. 20–23, 1987, pp. 759–763.

*Primary Examiner*—Amelia Au
*Assistant Examiner*—Samir Ahmed
*Attorney, Agent, or Firm*—Fitzpatrick, Cella, Harper & Scinto

[57] ABSTRACT

A method for identifying and extracting text data from a table-cell frame. The method includes the steps of tracing connected components of a document image, tracing white contours within a connected component, defining a frame outline based on the white contours, identifying unattached character data inside the frame outline, and defining an initial rectangular area inside the frame outline. The method further includes detecting black pixels in a horizontal or vertical direction from the initial rectangular area in order to create an extended character area, locating boundary pixels lying inside the extended character area for each white contour, identifying black pixels positioned between boundary pixels lying inside the extended character area, combining black pixels positioned between boundary pixels lying inside the extended character area so as to form at least one connected component, recognizing the at least one connected component as a text component if it is not recognized as a vertical line, as a horizontal line, as part of a broken line, or as part of the frame, and defining a character node of a hierarchical tree structure corresponding to the extended character area and containing both the at least one connected component and any identified unattached connected components.

15 Claims, 17 Drawing Sheets

SYSTEM FOR EXTRACTING ATTACHED TEXT

BACKGROUND OF THE INVENTION

1. Field of the Invention

The present invention relates to a system for analyzing image data of a document page utilizing a block selection technique, and in particular to a block selection system which is capable of identifying and extracting a text component attached to a frame within a document page.

2. Incorporation by Reference

U.S. patent application Ser. No. 08/596,716, "Feature Extraction System For Skewed and Multi-Orientation Document", and U.S. patent application Ser. No. 08/514,252, "Feature Extraction System", are hereby incorporated by reference.

3. Description of the Related Art

Recently developed block selection techniques, such as the techniques described in the aforementioned U.S. Patent Applications, are used in page analysis systems in order to identify and analyze different types of image data within a document page. The identification and analysis results are then used to determine a type of processing to be performed on the image data, such as optical character recognition (OCR), data compression data routing, etc. For example, image data which is designated as text data is subjected to OCR processing, whereas image data which is designated as picture data is not subjected to OCR processing. As a result, different types of image data can be automatically input and properly processed without an operator's intervention.

The operation of a block selection technique will be generally described below with respect to FIGS. 1–3. FIG. 1 shows page 101 of a representative document. Page 101 is arranged in a two column format and includes title 102, horizontal line 104, several text areas 105, 106 and 107, which include lines of text data, half-tone picture data 108, which includes a graphic image which is non-text, table 110, which includes text information, framed area 116, half-tone picture area 121 accompanied by caption data 126 and picture areas 132 and 135 accompanied by caption data 137. A block selection technique attempts to define each area of page 101 in accordance with the type of image data therein. As the block selection technique defines each area, a hierarchical tree structure is created, shown in FIG. 2.

Hierarchical tree structure 200 of FIG. 2 contains a plurality of nodes, each of which represents an identified area, or block, of image data. Each node of the tree contains feature data which defines the features of its corresponding block of image data. For example, the feature data may include block location data, attribute data (specifying image type, such as text, picture, table etc.), sub-attribute data, and child node or parent node pointers. Child, or "descendant" nodes represent image data which exist entirely within a larger block of image data. A child node is depicted in hierarchical tree structure 200 as a node branching from a parent node. For example, the text blocks within frame 116 are depicted in the hierarchical tree structure as nodes 214 and 216, which branch directly from parent node 212, which represents frame 116. In addition to the feature data described above, a node which represents a text block may also contain feature data defining the block's reading orientation and reading order. These data are useful when performing OCR processing on a page's text blocks.

In conventional block selection techniques, text blocks are often mis-identified in cases where text data lies adjacent to or overlaps other data. This problem is often encountered when processing table images contained in a document image. Due to the small size of table-cell frames, text circumscribed by one of these frames often is "attached" to a side of the frames. Accordingly, this text is identified as part of the frame, as a picture image, or as noise which is subsequently ignored by a block selection technique. Because the text is not identified as a text block, the text block is not subjected to OCR processing and the text characters within the block are therefore not accessible to a text editor. Furthermore, the reading order of the document's remaining text blocks will be assigned without consideration of the mis-identified text block. Therefore, because the reading order is mis-assigned, even the properly identified text blocks will be improperly processed. There is, therefore, a need to provide a block selection technique which is capable of identifying and extracting text data which is attached to a table-cell frame.

SUMMARY OF THE INVENTION

The present invention addresses the foregoing needs by providing a system for identifying and extracting text data which is attached to a frame of a table-cell. Thus, according to one aspect of the invention, the present invention is a method for identifying and extracting text data from a table-cell frame comprising the steps of tracing connected components within a document, tracing white contours inside a connected component, defining a frame outline based on the traced white contours, identifying unattached connected components inside the frame outline, and defining an initial rectangular area inside the frame outline.

The initial rectangular area is defined based on unattached connected components in a case where unattached connected components have been identified, based on the white contours in a case where no unattached connected components have been identified, and based on unattached connected components, the white contours and a distance from unattached connected components to an edge of the frame outline in a case where small unattached connected components have been identified.

The method of this aspect of the invention further comprises detecting black pixels in a horizontal or vertical direction from the initial rectangular area in order to create an extended character area, locating boundary pixels lying inside the extended character area for each white contour, identifying black pixels positioned between boundary pixels lying inside the extended character area, combining black pixels positioned between boundary pixels lying inside the extended character area so as to form at least one connected component, recognizing the at least one connected component as a text component if 1) a height of the at least one connected component is not less than a third predetermined threshold or a width-to-height ratio of the at least one connected component is not greater than a fourth predetermined threshold, 2) a width of the at least one connected component is not less than a fifth predetermined threshold or a height-to-width ratio of the at least one connected component is not greater than a sixth predetermined threshold, 3) a width or height of the at least one connected component is greater than a seventh predetermined threshold or the at least one text component is between an unattached connected component and another unattached connected component, and 4) a group of connected components comprising the at least one connected component and other connected components in the same row or column meets 1) and 2), and defining a character node of a hierarchical tree structure corresponding to the extended character area and containing both the at least one connected component and any identified unattached connected component.

According to another aspect, the present invention is a method for determining whether a connected component which is attached to a frame within a table image is a text component comprising the steps of defining an initial rectangular area inside the frame outline, detecting black pixels in a horizontal or vertical direction from the initial rectangular area in order to create an extended character area, locating boundary pixels lying inside the extended character area, identifying black pixels positioned between boundary pixels lying inside the extended character area, combining black pixels positioned between boundary pixels lying inside the extended character area so as to form at least one connected component, and recognizing the at least one connected component as a text component based on predetermined threshold measurements.

DETAILED DESCRIPTION OF THE PREFERRED EMBODIMENT

Figure 1:
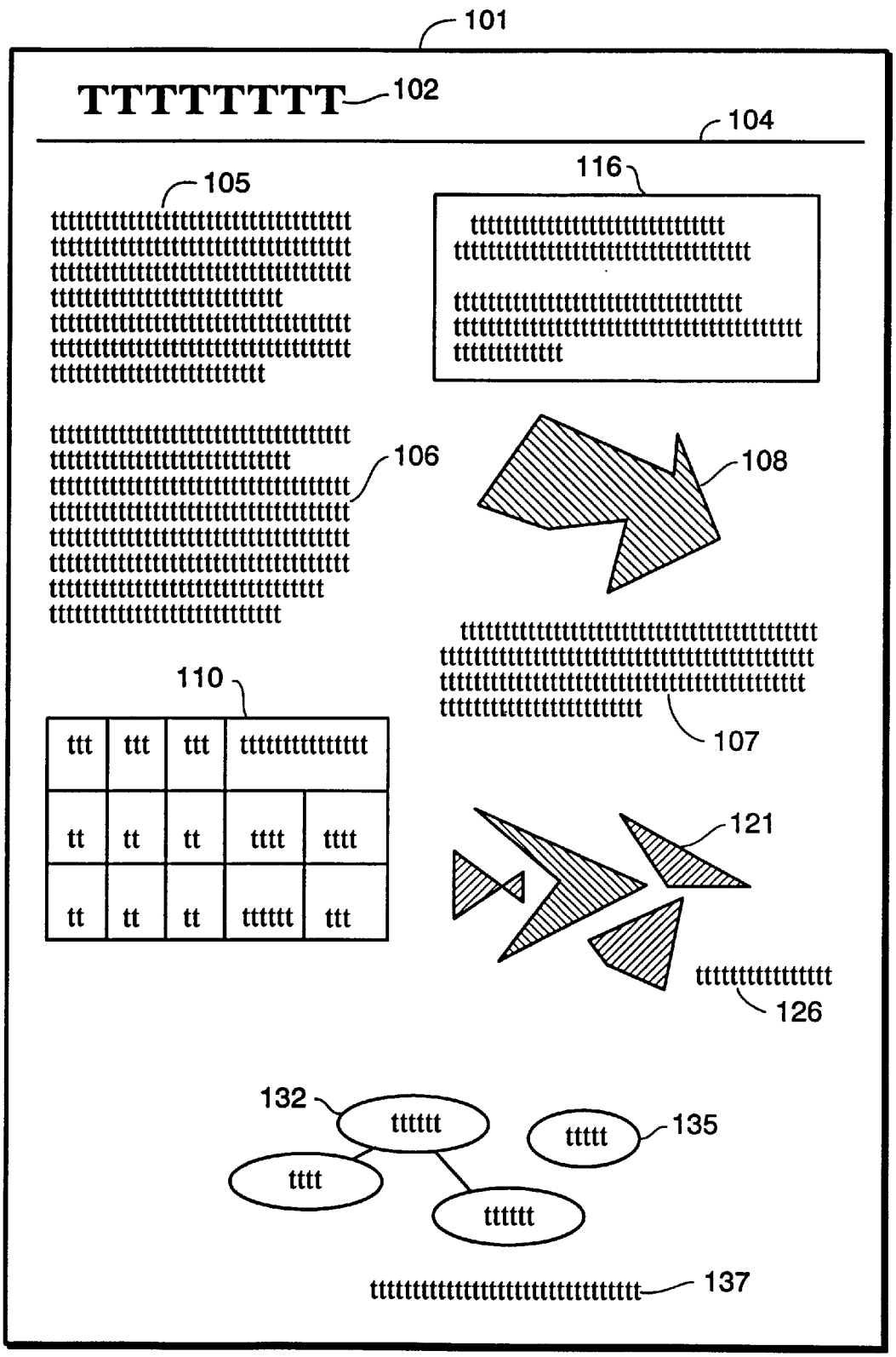
FIG. 1 is a representational view of a document page.
Figure 2:
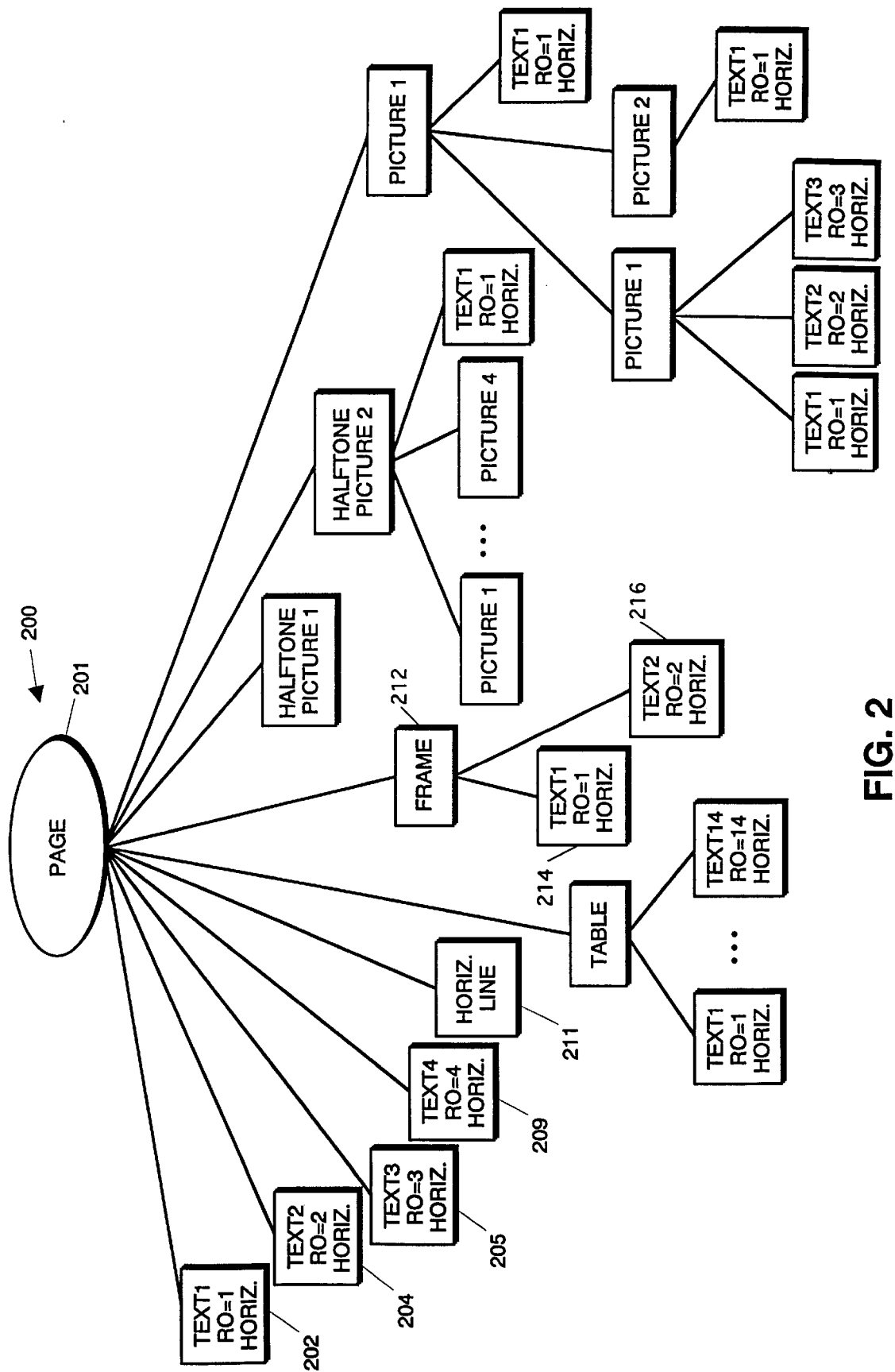
FIG. 2 is a representational view of a hierarchical tree structure created by a block selection technique.
Figure 3:
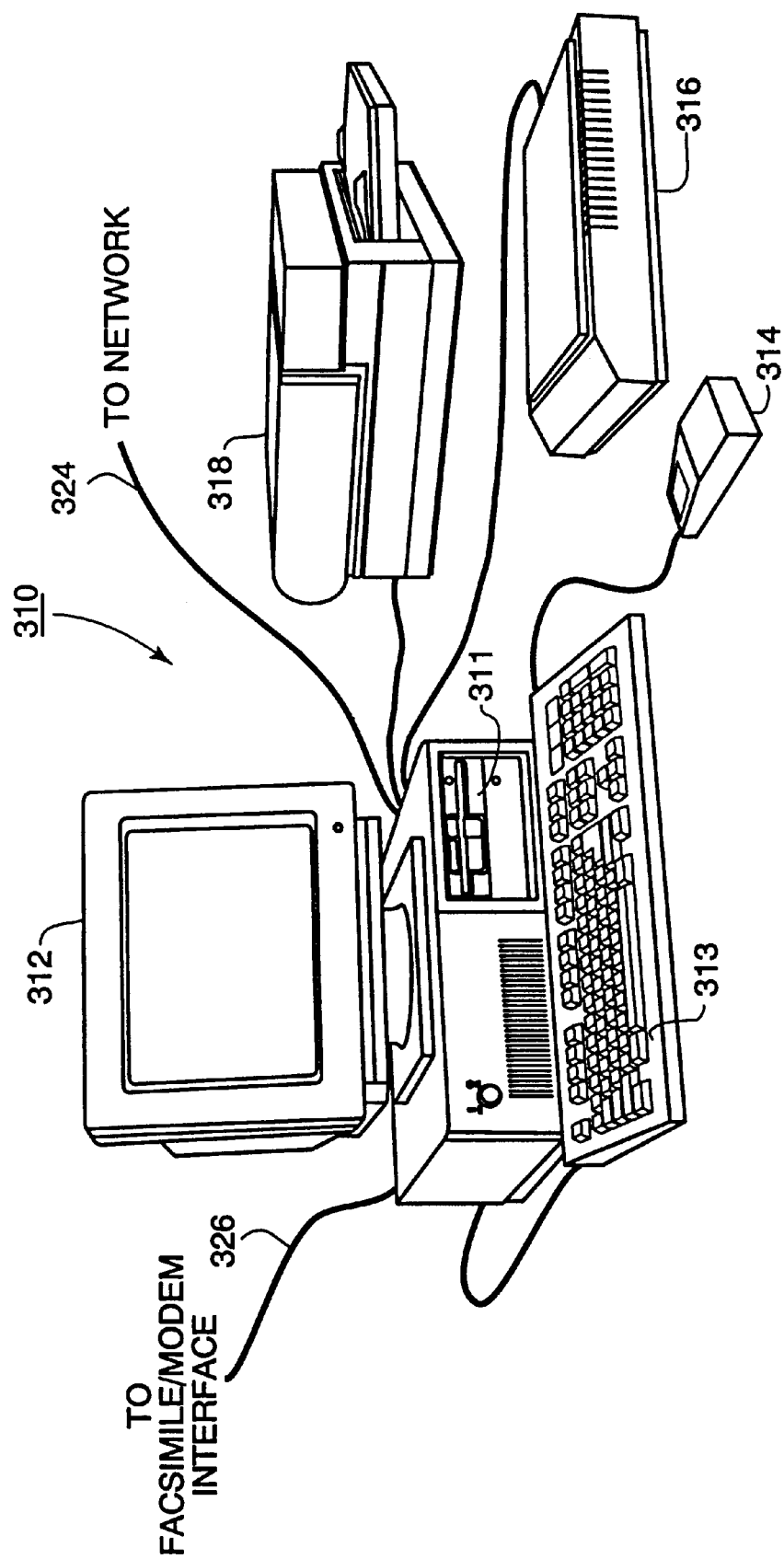
FIG. 3 is a perspective view showing the outward appearance of an apparatus embodying the present invention.

FIG. 3 is a view showing the outward appearance of a representative embodiment of the invention. Shown in FIG. 3 is component system 310, which may be a Macintosh or an IBM PC or PC-compatible system having a windowing environment, such as Microsoft Windows. Provided with computer system 310 is display screen 312, such as a color monitor, keyboard 313 for entering user commands, and pointing device 314 such as a mouse for pointing to and for manipulating objects displayed on display screen 312.

Computer system 310 include a mass storage device such as computer disk 311 for storing data files which include document image files, in either compressed or uncompressed format, and for storing application program files which include a block selection application program embodying the present invention. Also stored in disk 311 are various hierarchical tree structure data corresponding to document pages which have been processed according to a block selection technique.

In practicing the present invention, a multi-page document may be input by scanner 316 which scans each page of the document and provides bit-mapped image data of those pages to computer system 310. The image data may also be input into computer system 310 from a variety of other sources, such as from a network through network interface 324 or from other sources such as the World Wide Web through facsimile/modem interface 326. Printer 318 is provided for outputting processed document images.

It should be understood that, although a programmable general purpose computer system is shown in FIG. 3, a dedicated, or stand-alone, computer or other type of data processing equipment can be used to practice the present invention.

Figure 4:
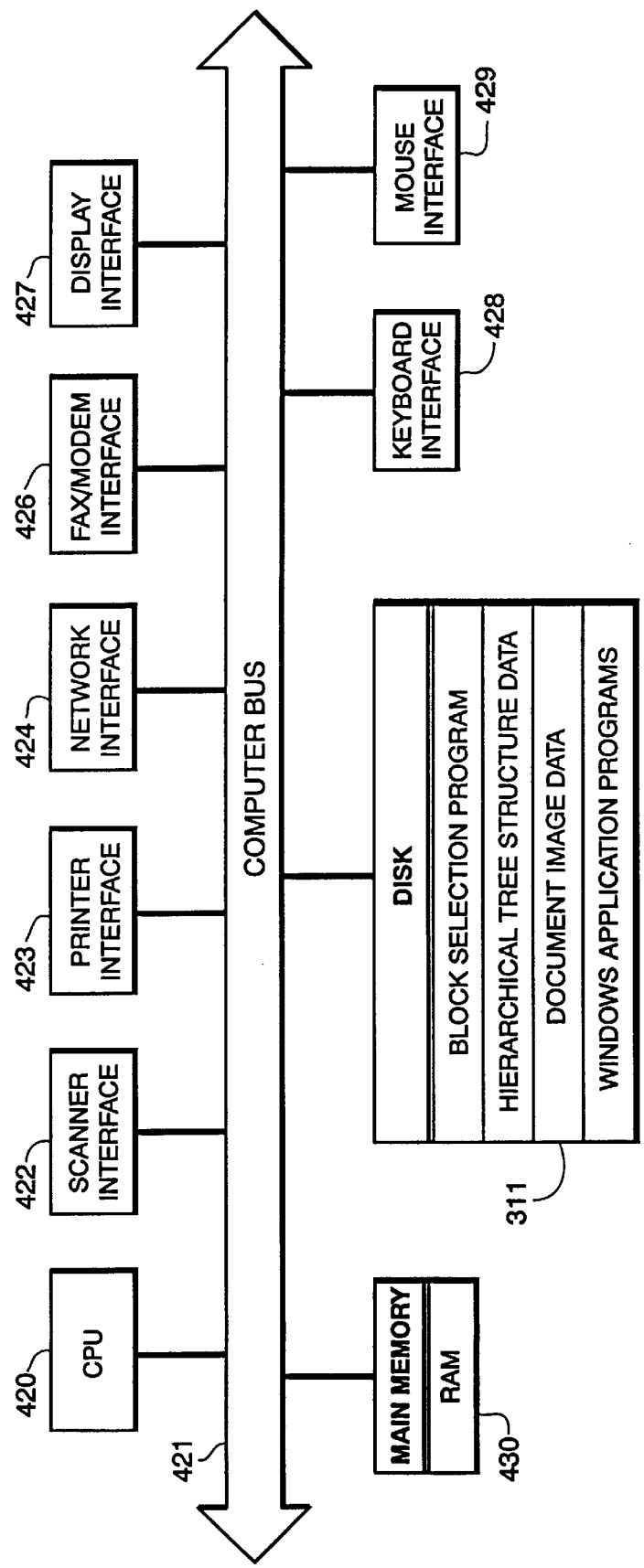
FIG. 4 is a block diagram of an apparatus embodying the present invention.

FIG. 4 is a detailed block diagram showing the internal construction of computer system 310. As shown in FIG. 4, computer system 310 includes central processing unit (CPU) 420 which interfaces with computer bus 421. Also interfaced with computer bus 421 is scanner interface 422, printer interface 423, network interface 424, fax/modem interface 426, display interface 427, keyboard interface 428, mouse interface 429, main random access memory ("RAM") 430, and disk 311.

Main memory 430 interfaces with computer bus 421 so as to provide RAM storage to CPU 420 for executing stored process steps such as the process steps of a block selection technique according to the present invention. More specifically, CPU 420 loads process steps from disk 311 into main memory 430 and executes the stored process steps from main memory 430 in order to identify and extract text data which is attached to a table-cell frame in a document image.

In accordance with a user's instructions, entered using either keyboard 413 or mouse 414, other stored application programs provide for image processing and data manipulation. For example, a desktop word-processing program, such as WordPerfect for Windows®, may be activated by an operator to create, manipulate and view documents before and after applying a block selection technique to the documents. Similarly, a page analysis program may be executed to perform a block selection technique on a document page and to display the results of the technique to an operator via a windowing environment.

Figure 5A:
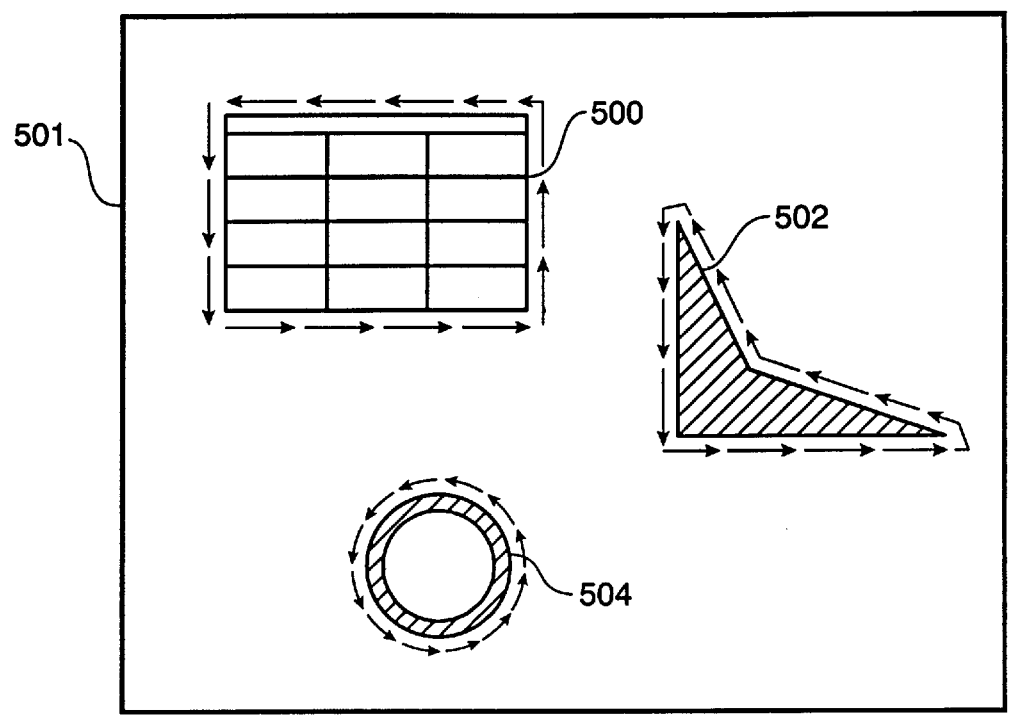
FIGS. 5A and 5B are views for describing contour tracing of connected components.
Figure 5B:
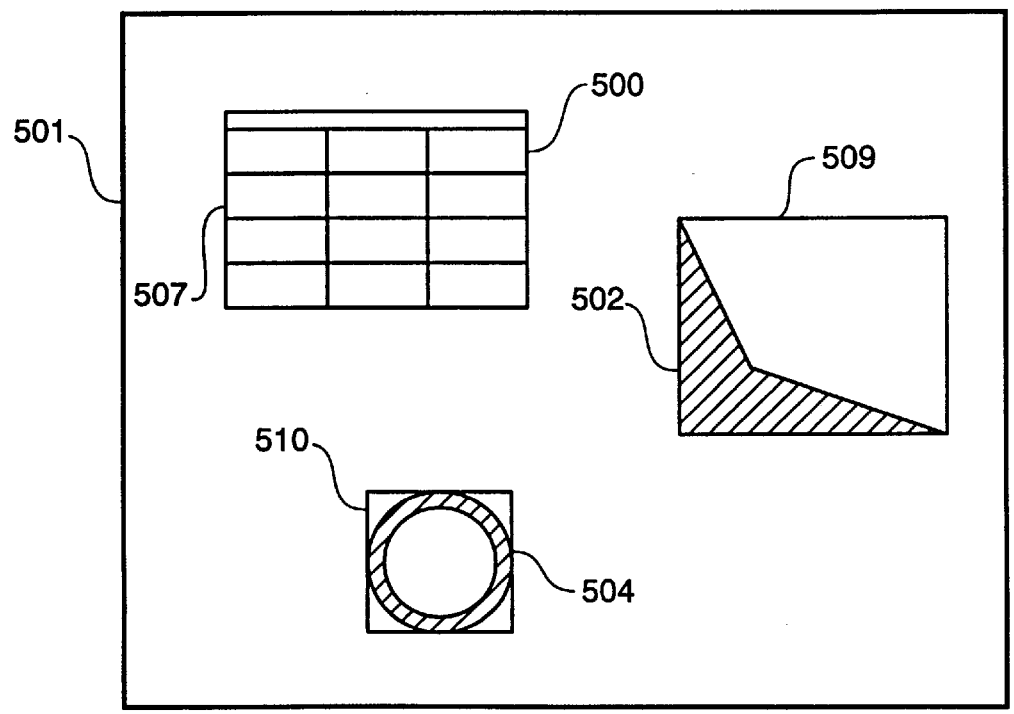
Figure 6:
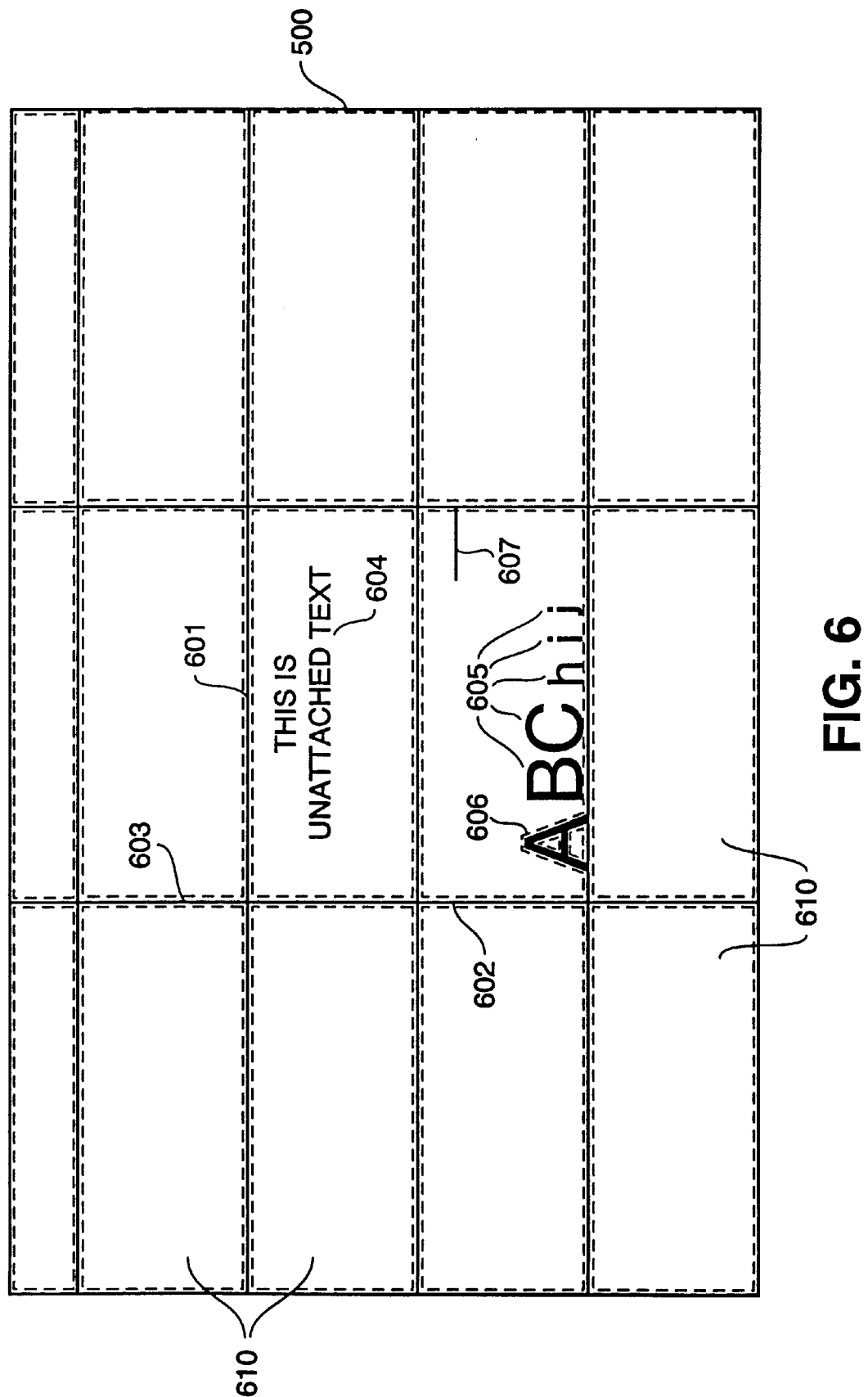
FIG. 6 is a representational view of a table in an analyzed document.

A brief description follows with respect to FIGS. 5A, 5B and 6 as to how a block selection techniques according to the present invention identifies a table in a document.

To begin the process of analyzing a document, a document to be analyzed is inserted into scanner 318. Scanner 318, in turn, creates a bit-mapped image representing the document. The image data is stored on disk 311 via computer bus 421 for further processing. Also stored on disk 311 is a block selection application program which contains process steps for executing a block selection technique on the document image data.

The process steps are stored in main memory 430 and are executed therefrom by CPU 420. As described above, the process steps of the block selection technique function so as to identify different types of image data within the document image. For the purpose of this description, it is assumed that the document page contains a table, such as document page 501 of FIG. 5A.

First, a block selection technique according to the present invention attempts to identify the image data within a document page by tracing connected components within the page. A connected component is a group of black pixels which is completely surrounded by white pixels. For example, FIG. 5A shows document page 501 containing tables 500, 502 and 504, each of which are connected components. One technique for tracing connected components is disclosed in aforementioned U.S. patent application Ser. No. 08/596,716.

Tracing is performed by scanning a selected section of image data from the lower right hand portion of the selected section to the left, turning each time a border or previously scanned portion of the desired section is encountered. If a "black" pixel is encountered, adjacent pixels are inspected in order to determine whether any adjacent pixels are also black. If an adjacent black pixel is located, the inspection proceeds from the adjacent black pixel until the exterior contour of the image has been traced. In accordance with the present invention, there is no need to trace the interior portion of a connected component such as picture 504.

After picture 504 is traced, scanning proceeds until a new black pixel is encountered, which initiates tracing of table 500. The above process continues until all connected components in the image have been traced.

Once the connected components have been traced, each connected component is rectangularized. For example, as shown in FIG. 5B, rectangularization consists of defining the smallest possible rectangular area which completely envelopes a traced connected component. Thus, rectangles 507, 509 and 510 are drawn around table 500 and pictures 502 and 504. The size of each of these rectangles is compared with a threshold size in order to determine whether the circumscribed connected component might be a table. Therefore, because the size of rectangle 507 is greater than the threshold size, table 500 undergoes further processing to determine whether it is a table.

A detailed view of table 50 is shown in FIG. 6. Table 500 includes several individual table-cells, such as table cells 601 and 602. Table-cell 601 contains unattached text 604. Table-cell 602 contains unattached text 605, and also contains attached text/data 606 and 607.

In order to determine whether table 500 is a table, white contours within the table are traced. Again, this technique is disclosed in above-mentioned U.S. patent application Ser. No. 08/596,716 and will therefore only be generally described below.

White contours are traced in a manner similar to that described above with respect to connected components, but with white pixels being inspected rather than black pixels. Thus, the interior of table 500 is scanned for white pixels from the bottom right hand portion to the upper left hand portion. When a first white pixel is encountered, adjacent pixels are inspected to determine whether any of the adjacent pixels are also white. Tracing continues until all white contours enclosed by black pixels are traced. For example, the white contours of table 500, denoted by reference number 610, are shown in FIG. 6.

A technique for identifying a table based on its internal white contours is disclosed in detail in U.S. patent application Ser. No. 08/514,252. Briefly, once the white contours inside table 500 are traced, the number of white contours is compared with another predetermined threshold. In the case of table 500, the number of white contours is greater than this threshold. Therefore, table 500 is analyzed further to determine whether it is a table.

Particularly, the white contours 610 which appear to belong to the cell or table 500 are grouped together. For example, white contours within table-cell 602 appear to form a rectangular area and are therefore grouped together. A technique for grouping these white contours together is also disclosed in aforementioned U.S. patent application Ser. No. 08/514,252.

These grouped white contours are rectangularized as described above with respect to connected components. However, unlike the rectangularization described above, the rectangularization of these white contours creates a frame outline, which is the smallest rectangle which completely envelopes all traced white contours within a group. After the groups of white contours have been rectangularized, the frequency with which the contours were grouped, known as the group rate, is examined.

Because the grouping rate of table 500 is low, table 500 is determined to be a table. As such, a table node of a hierarchical tree structure is created having child nodes corresponding to each cell of table 500. Each cell is defined as having an area equal to that circumscribed by a frame outline created by rectangularizing the white contours within the cell. Similarly, the nodes representing each cell of table 500 have a child node representing the white contours within the cell. FIG. 7 shows sample table cells and their corresponding white contours and frame outlines.

Figure 7A:
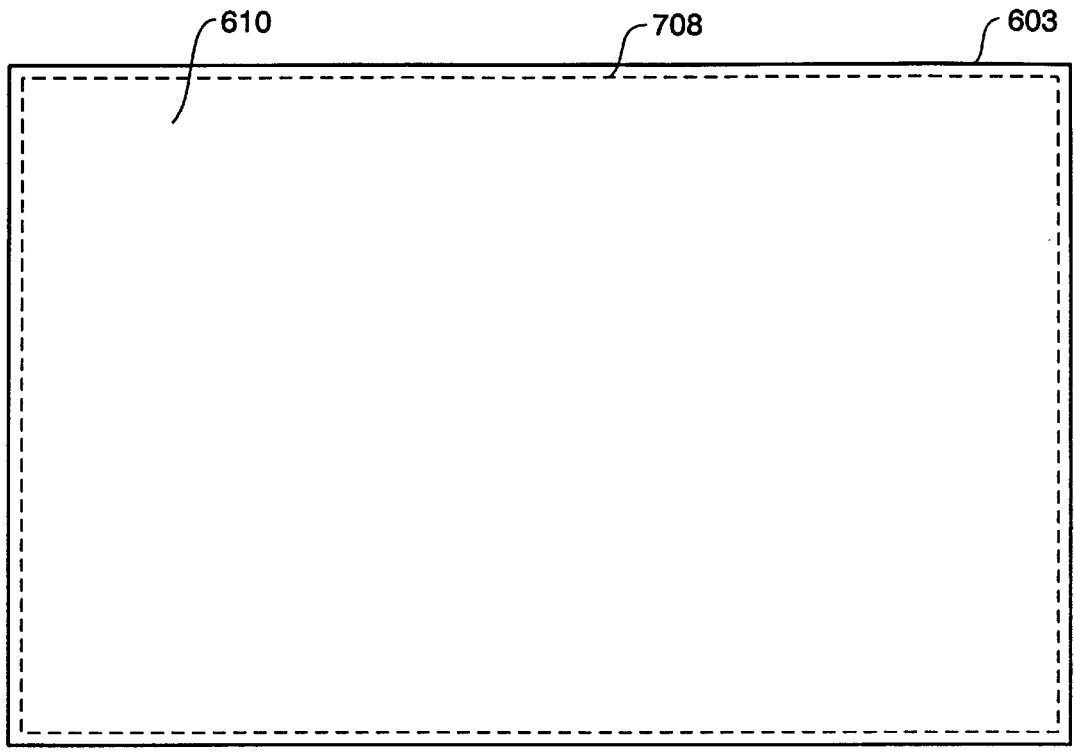
FIGS. 7A, 7B and 7C are views for describing white contour tracing.
Figure 7B:
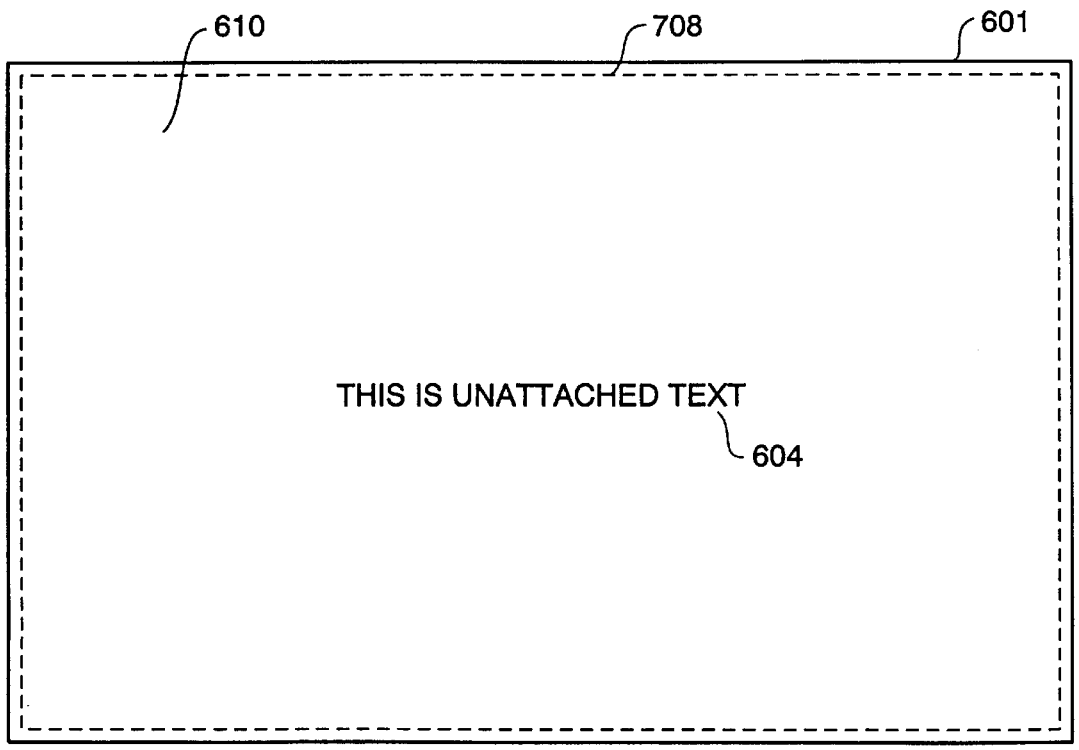

For example, FIG. 7A shows the interior of an "empty" table-cell 603 after white contour tracing has been performed. As shown, single white contour 610 exists within table-cell 603. It should be noted that white contour 610 lies directly adjacent to each edge of table-cell 603 or in the case that a connected component exists within the cell, adjacent to the connected component itself. Similarly, FIG. 7B shows traced white contour 610 within table-cell 601 containing unattached connected components 604.

Figure 7C:
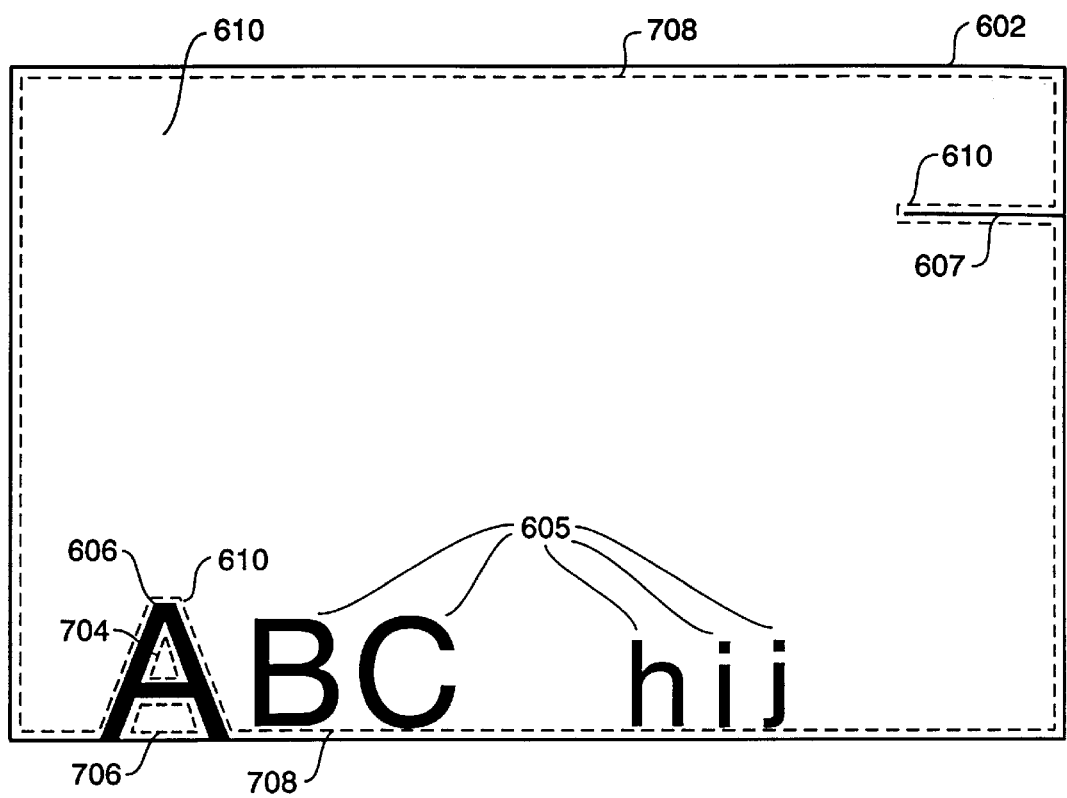

FIG. 7C shows traced white contours 610, 704 and 706 within table-cell 602 containing both attached connected components 606 and 607 and unattached connected components 605. As also shown in FIG. 7C, the above-described method of tracing results in white contours which circumscribe an exclusive area. As a result, after tracing, no white contours exist within another white contour.

Returning to table 500, the connected components within each white contour are traced as described above in order to rectangularize and identify any unattached connected components within each cell. After this operation is performed, the hierarchical tree structure is updated with nodes representing the unattached connected components.

However, when tracing connected components within each white contour, the present invention is unable to trace and identify an attached connected component such as component 606 of table-cell 602, as shown in FIG. 7C. In particular, the above-described method of contour tracing is unable to trace the side of attached component 606 which is attached to table-cell 602. Since attached connected component 606 cannot be properly traced, it is not rectangularized and therefore not subsequently identified and represented by a node.

Figure 8A:
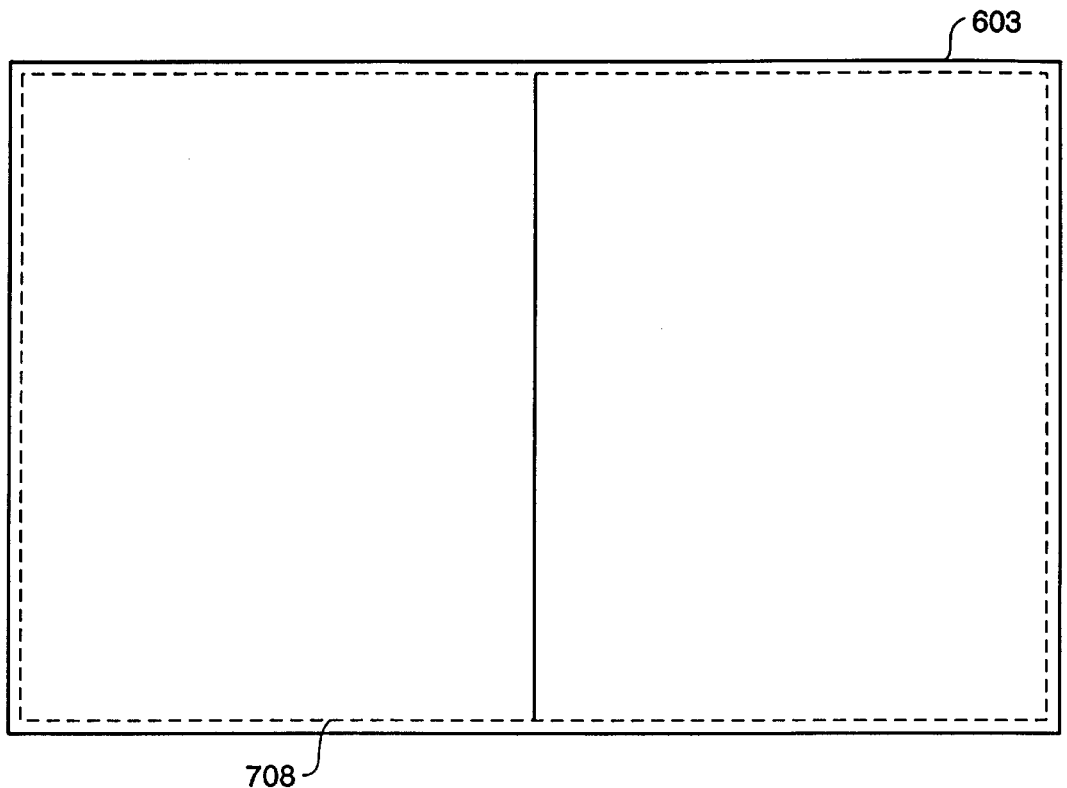
FIGS. 8A, 8B and 8C are views for describing a method for defining an initial rectangular area.

Therefore, in order to identify whether attached text data exists within a table-cell, an initial rectangular area is defined. For example, no unattached connected components are located within table-cell 603, therefore the initial rectangular area is defined as shown in FIG. 8A. Specifically, initial rectangular area 801 is defined as a rectangle having left and right sides both located at the horizontal midpoint of frame outline 708 and extending from one pixel below the top of frame outline 708 to one pixel above the bottom of frame outline 708.

In the case that unattached connected components exist within a table-cell, identified unattached connected components are rectangularized as described above with respect to frame outline 708, thereby creating a rectangle which circumscribes all unattached connected components.

Figure 8B:
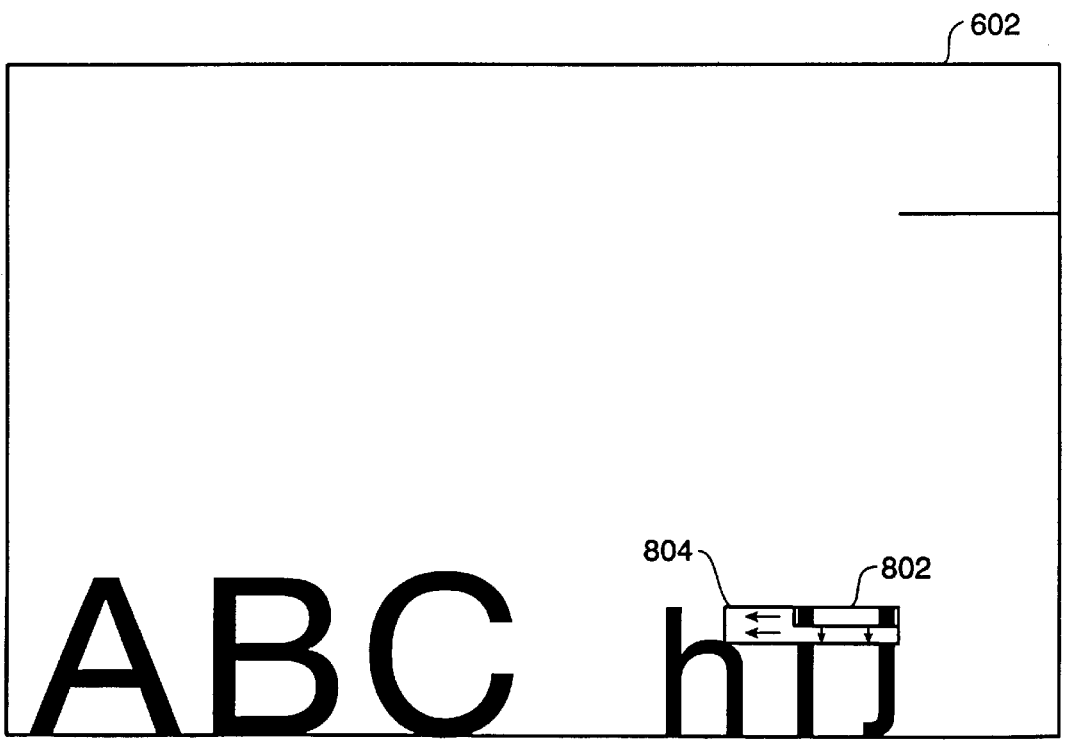

For the example shown in FIG. 8B, it will be assumed that each of the letters "ABC hij" in table-cell 602 touches the table-cell 602. In this case, the area of circumscribing rectangle 802 is then compared to a threshold value X2. If the area is less than X2, each side of circumscribing rectangle 802 is extended until it reaches a row or column containing a black pixel. The sides can be extended one at a time or simultaneously. If no black pixel has been encountered by the time the cide is a specified distance from frame outline 708, the side remains at its original position, as shown in FIG 8B. The initial rectangular area is defined as resulting rectangle 804.

Figure 8C:
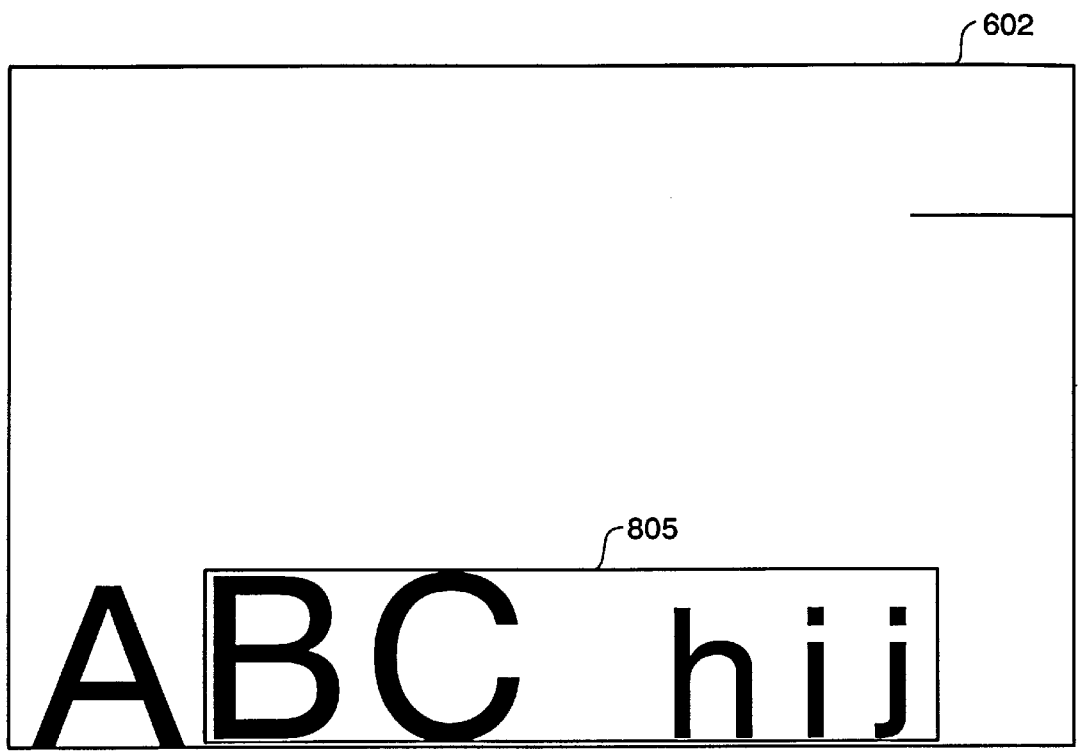

Returning to the original table-cell 602, in the case that the area of the circumscribing rectangular area is greater than a predetermined threshold value X2, the initial rectangular area is defined as circumscribing rectangular area 805, shown in FIG. 8C.

Once the initial rectangular area is defined, the area is extended to include any attached connected components located within table-cell 602.

Figure 9A:
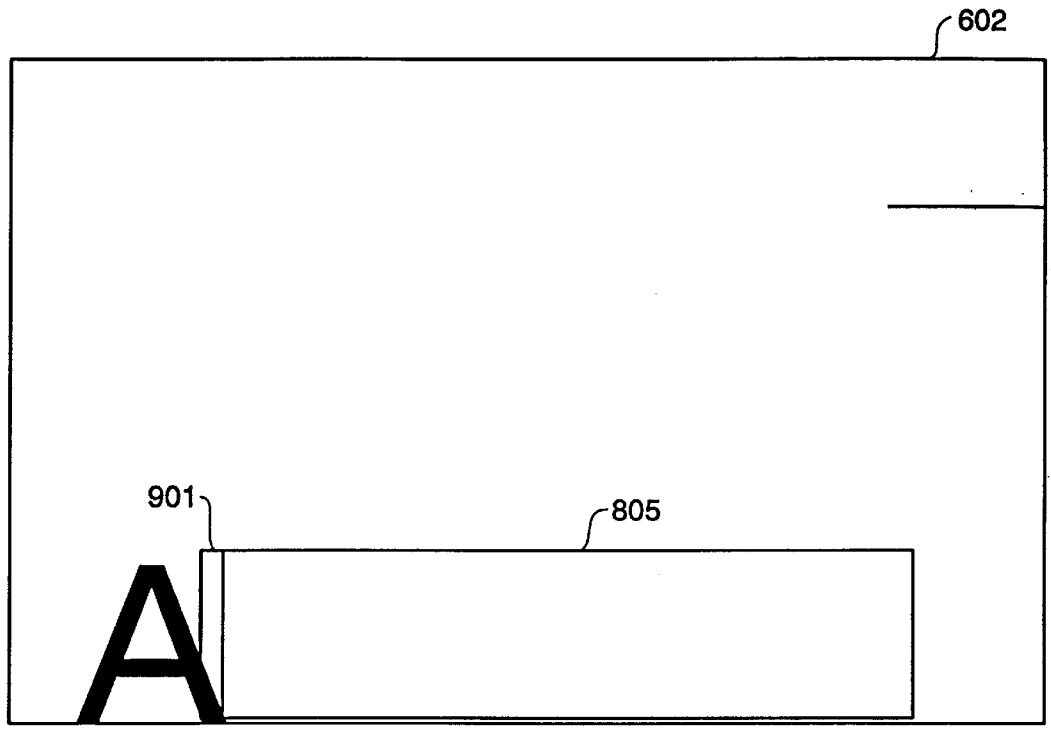
FIGS. 9A, 9B, 9C and 9D are views for describing a method for extending an initial rectangular area.

In order to extend the initial rectangular area, a detection area is defined as the entire row or column directly adjacent to one side of the initial rectangular area. For example, as shown in FIG. 9A, detection area 901 adjacent to initial rectangular area 805 is defined.

Figure 9B:
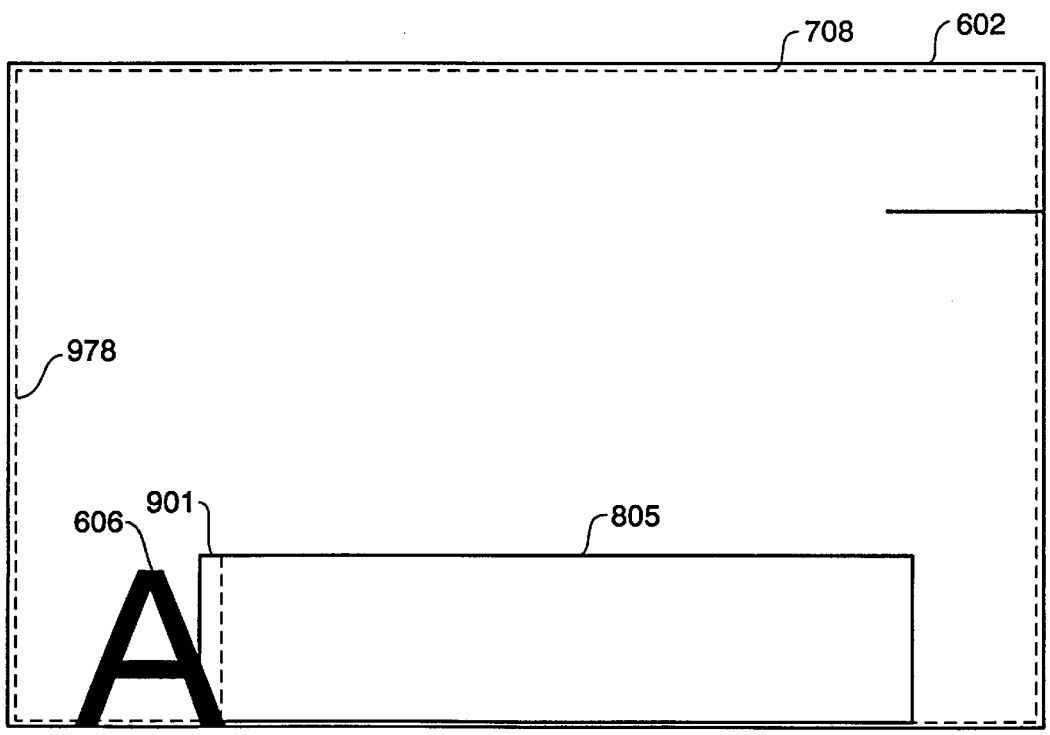

Once the detection area has been defined, each pixel in the detection area is examined. If any black pixels exist in the detection area, initial rectangular area 805 is extended to include detection area 901. As shown in FIG. 9B, due to attached connected component 606, the left side of initial rectangular area 805 has been extended to include detection area 901.

If no black pixels are detected in the detection area, and if the distance between the detection area and boundary 978 of frame outline 708 which lies opposite from initial rectangular area 805 is greater than a predetermined distance X3, the detection area is redefined.

The detection area is redefined to be group of pixels 902 adjacent to the previous detection area toward boundary 978 of frame outline 708 described above, as shown in FIG. 9C. The process then continues as described above.

Figure 9C:
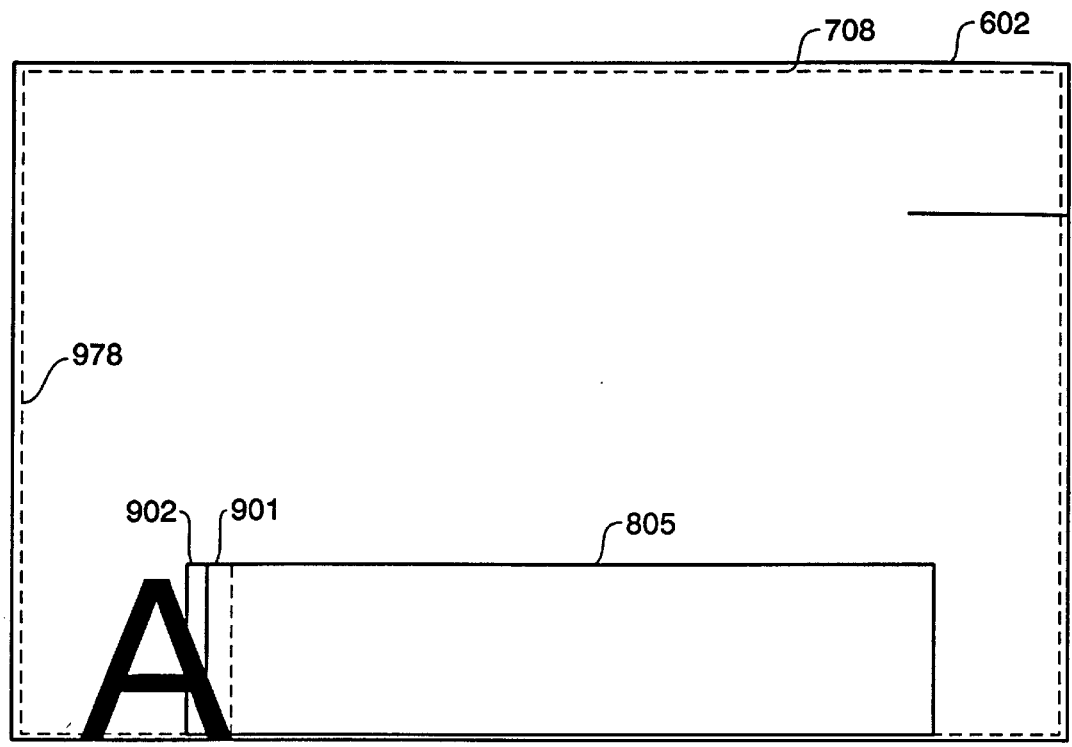
Figure 9D:

If no black pixels are detected in the detection area and if the distance to boundary 978 is less than or equal to distance S3, it is assumed that no connected components are attached to this side of table-cell 602. If all sides of the extended rectangular area have not been examined, a new detection area is defined as a row or column of pixels directly adjacent to another side of original initial rectangular area 805, and the above process is repeated. Again, it should be noted that, in another aspect of the present invention, each side may be extended simultaneously. FIG. 9D shows table-cell 602 and extended character area 910 after the above extension process has been completed.

After the above extension process is completed, the initial rectangular area now includes any black pixels located within frame outline 708, including those black pixels which are on the boundary of frame outline 708. Furthermore, by virtue of this process, extended rectangular area 910 is the smallest rectangle which contains all of the attached and unattached connected components located within table-cell 602.

Extended rectangular area 910 and the white contours within table-cell 602 are used to combine groups of black pixels inside extended text area 910. The black pixels are combined in order to extract any attached connected components.

To combine the black pixels, first row 1001 of extended character area 910 is selected. Any boundary pixels located in selected row 1001 are identified. Boundary pixels are all pixels of a particular row which are on the boundary of a selected white contour. For example, pixels w1, w2, w3, and w4 of row 1002 are boundary pixels.

The identified boundary pixels are numbered sequentially from the left end of table-cell 602. In the case that each white contour has been analyzed with respect to the currently selected row, the next row is analyzed. If not, another white contour is selected. In the case that boundary pixels of more than one white contour are located on a single row, the boundary pixels are numbered sequentially from the last number assigned to a boundary pixel in that row. For example, in the case of row 1002, boundary pixels w1, w2, w3 and w4 are identified during the analysis of white contour 704. Thereafter, two boundary pixels are identified corresponding to white contour 704. These boundary pixels are numbered w5 and w6, respectively. It should be noted that this numbering scheme applies only to boundary pixels located in a single row, and that boundary pixel numbering resets to w1 each time a new row is analyzed.

Before a new row is analyzed, black boundary pixels are identified. Black boundary pixels are black pixels of the selected row which are located on the extended rectangular area 910. For example, when row 1001 is selected, black pixel P is identified.

Figure 10A:
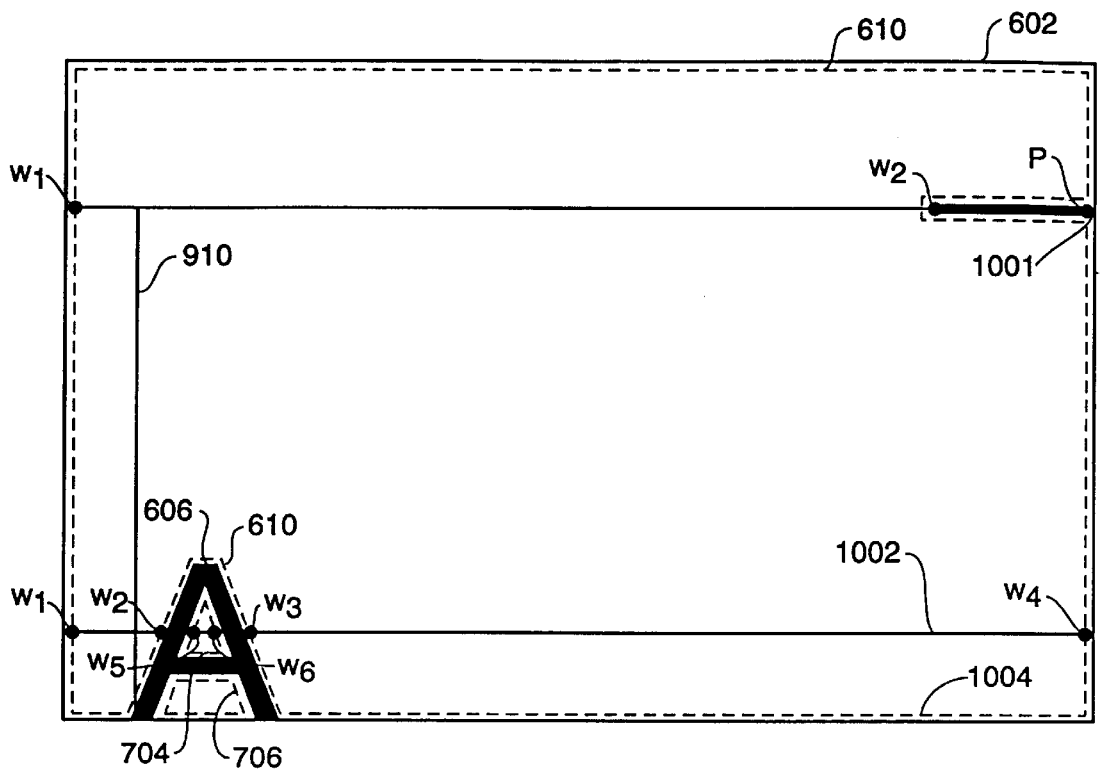
FIGS. 10A and 10B are views for describing a method for grouping black pixels to form attached connected components.
Figure 10B:
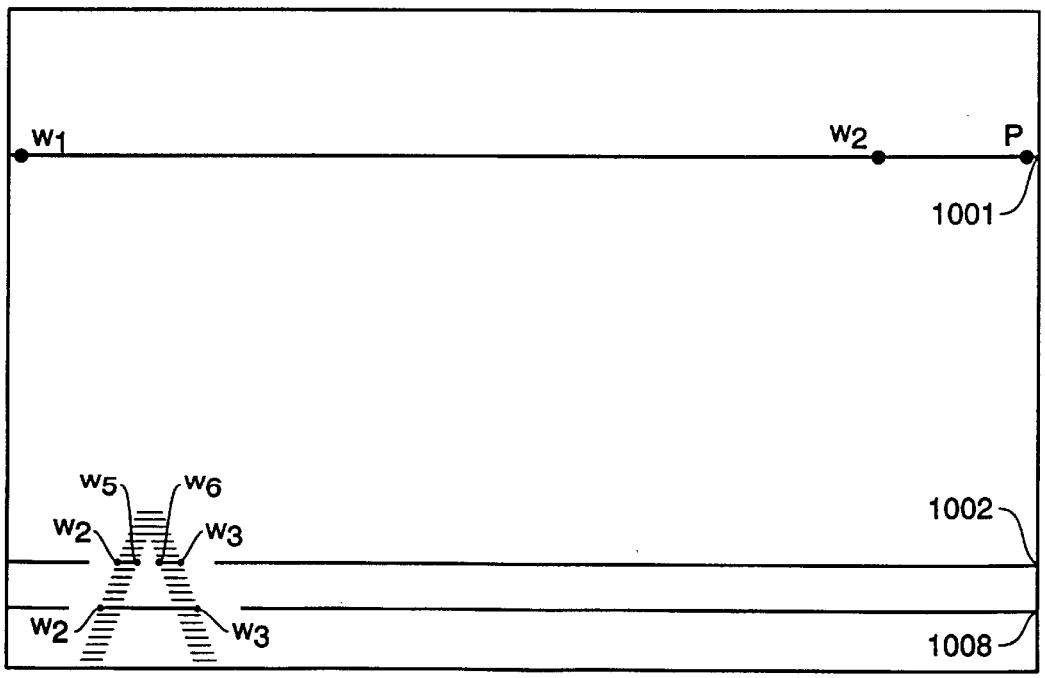
Figure 11A:
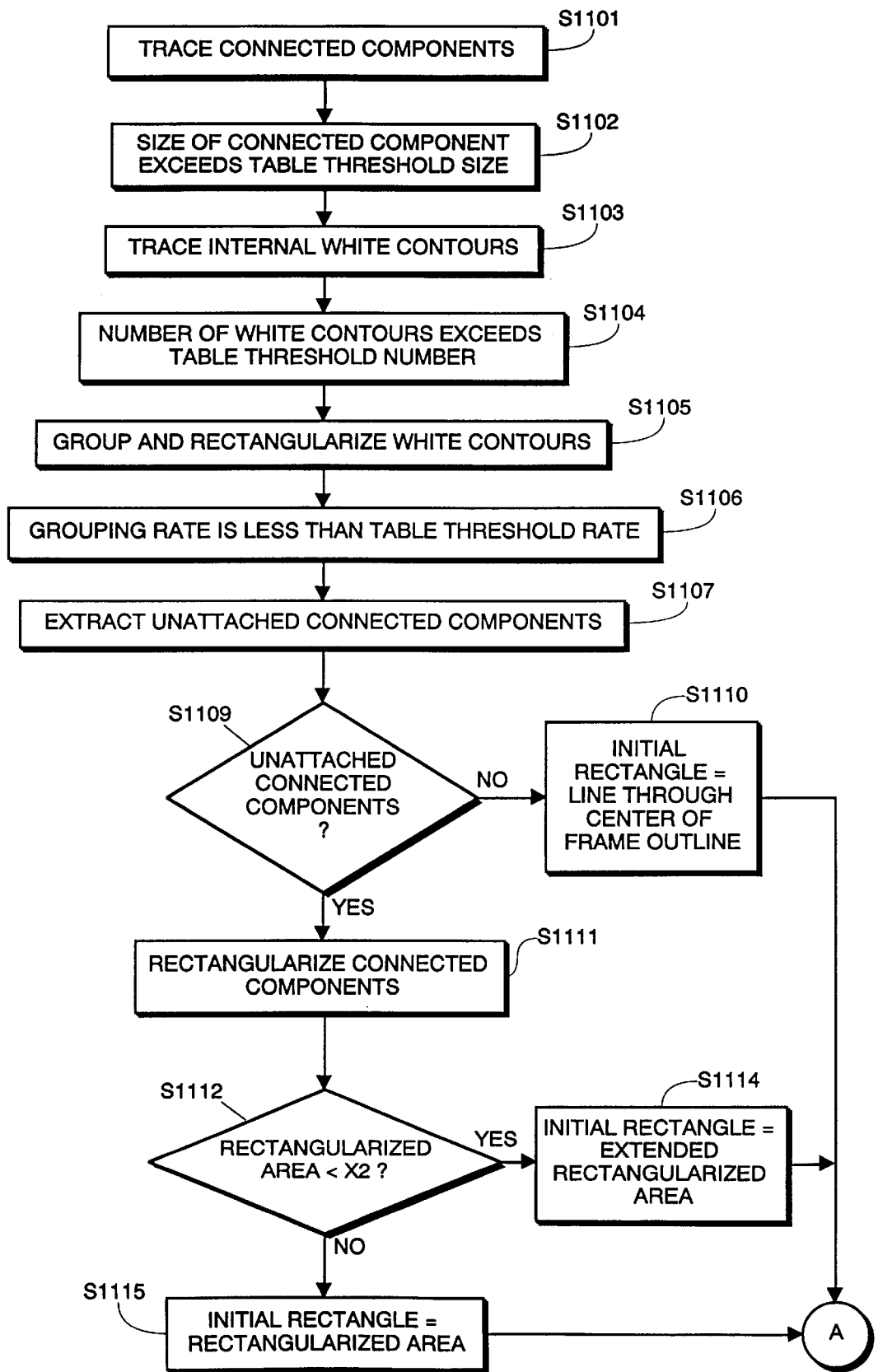
FIGS. 11A, 11B, 11C and 11D are a detailed flow diagram describing a method for extracting and identifying an text attached connected component according to the present invention.
Figure 11B:
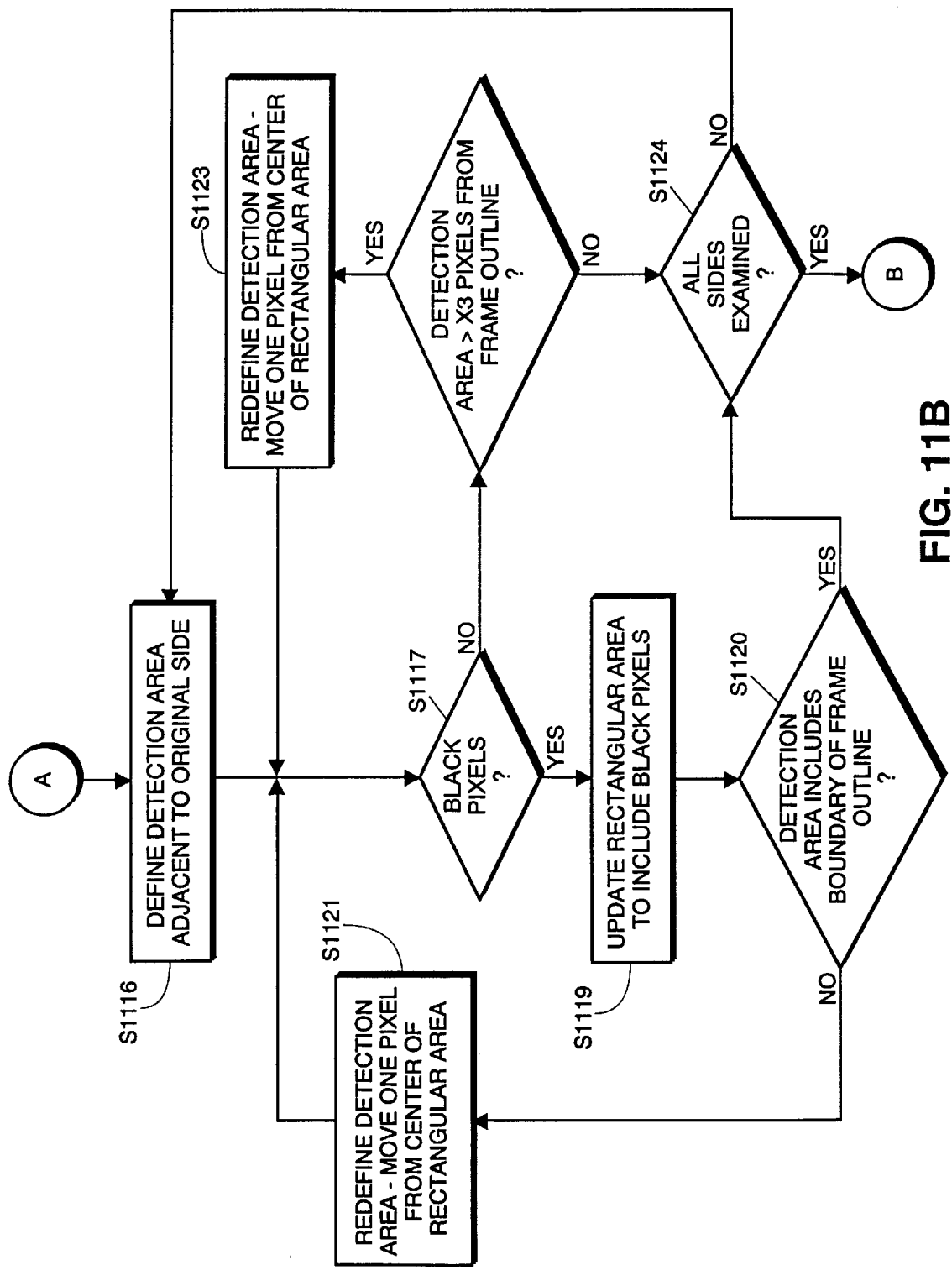
Figure 11C:
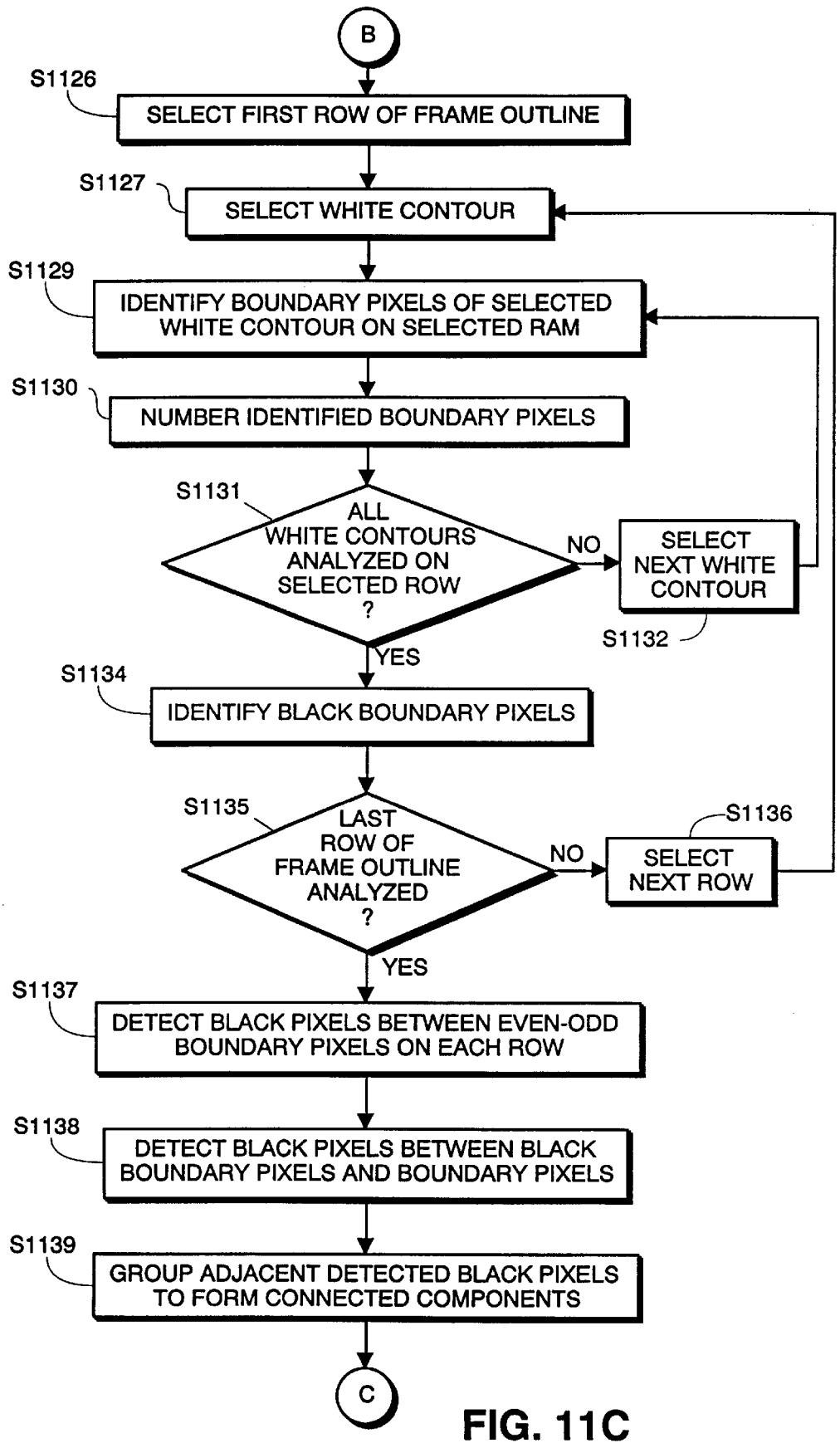
Figure 11D:
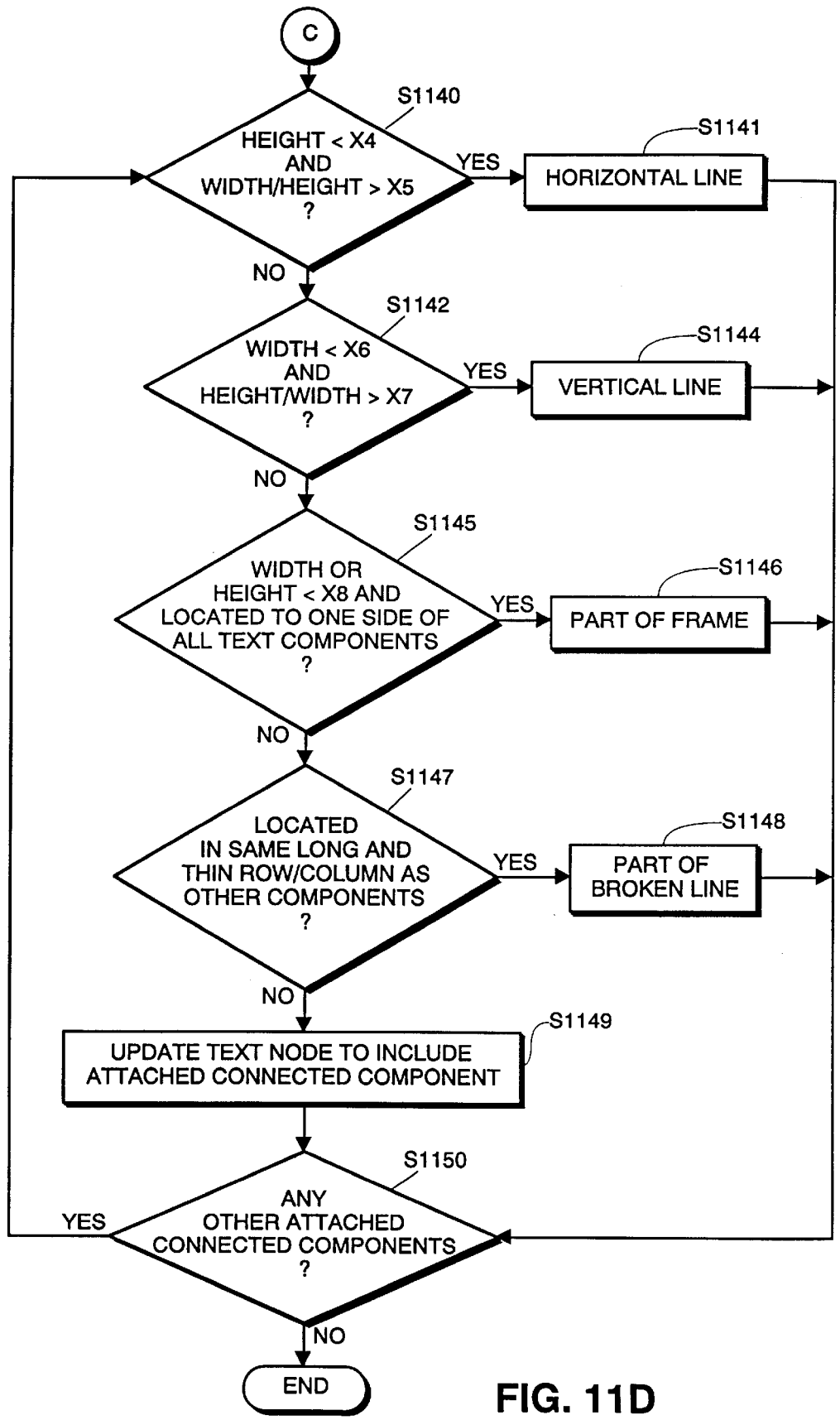

Once the boundary pixel and the black boundary pixels within cell 602 have been identified, black pixels which lie between even and odd-numbered boundary pixels of a single row are detected. For example, as shown in FIG. 10B, black pixels are detected in row 1002 between boundary pixels w2 and w5 and between boundary pixels w6 and w3. In addition, in row 1008, black pixels between boundary pixels w2 and w3 are detected. Black pixels are detected in this manner for each row of the extended character area 910.

The present invention then detects black pixels lying between an even-numbered boundary pixel and a black boundary pixel. For example, the black pixels lying between pixel w2 of row 1001 and black boundary pixel P are detected. Similarly, black pixels lying between a black boundary pixel and an odd-numbered boundary pixel are detected.

Each detected black pixel is grouped together to form attached connected components. For example, in FIG. 10B, adjacent black pixels are grouped together in order to form the attached connected component "A".

A formed attached connected component is examined to determine whether it is a horizontal line. Accordingly, if the height of the component is less than a predetermined threshold X4 and if the width-to-height ratio of the component is greater than a predetermined threshold X5, the component is designated a horizontal line.

Similarly, if the width of the component is less than a predetermined threshold X6 and the height-to-width ratio of the component is greater than a predetermined threshold X7, the component is designated a vertical line.

Next, if the height or width of the component is less than a predetermined threshold X8 and the component is also entirely above, below or to either side of all text connected components within the frame, the component is designated as part of table-cell 502.

Finally, the component is analyzed to determine if any other components are located in its row or column. If so, the column or row of components is examined as described above with respect to horizontal and vertical lines. If the row or column of components meet the criteria of either a vertical or horizontal line, the components are designated as a broken line.

If none of the above four criteria are met, the attached connected component is assumed to be a text component. Accordingly, a node is created representing attached text 606.

Due to the foregoing, the text within table-cell 602 can be automatically processed in accordance with an OCR system. Thereafter, utilizing keyboard 323 and mouse 314, the text can be further processed with a word-processing application stored on disk 311 and the entire document image can be output using printer 318.

The operation of identifying and extracting attached text/ character data will now be described in detail with reference to the flow diagrams in FIG. 11, which is comprised of FIGS. 11A, 11B, 11C and 11D, and with reference to FIGS. 5 through 10.

In step S1101, the connected components of a document image are traced. As described above and as shown in FIG. 5A, in order to identify table 500, the exterior black pixels of table 500 are traced. After tracing table 500, the result of the tracing is used in step S1102 to determine if the size of the traced component is equal to or greater than a predetermined threshold which would indicate that the traced component could be a table. In the present case, the size of table 500 is greater than the predetermined threshold so identification of the image proceeds to step S1103, at which point the white contours 610 within table 500 are traced.

In step S1104, if the number of white contours within a traced connected component is less than a predetermined number, the connected component is not a table. However, because the number of white contours 610 in table 500 is greater than the predetermined number, flow continues from step S1104 to step S1105 in order to determine whether table 500 is a table.

In step S1105, the white contours are grouped and rectangularized to form frame outlines, which are shown in FIG. 7 and denoted by reference number 708. In step S1606, if the frequency with which the white contours are grouped is less than a predetermined rate, the connected component containing the white contours is determined to be a table. In the case of table 500, table 500 is determined to be a table because the grouping rate of the white contours 610 of table 500 is small. Flow then proceeds to step S1107.

In step S1107, unattached connected components within the white contours of each cell of table 500 are traced. Once these components are traced, nodes representing the components are created and placed in a hierarchical tree structure so as to descend from a node representing the white contours which contain the unattached connected components. At this point, the hierarchical tree structure does not contain any nodes which represent attached connected components within table 500.

Therefore, in step S1109, if no unattached connected components exist, flow proceeds to step S1110 at which point the initial rectangular area is defined as shown in FIG. 8A.

However, in the case that any unattached connected components exist, flow proceeds from step S1109 to step S1111. In step S1111, the unattached connected components are rectangularized to form a circumscribing rectangle, such as rectangles 802 and 805 of FIGS. 8B and 8C. Thereafter, the area of the circumscribing rectangle is compared to a threshold value X2 in step S1112.

If the area of a circumscribing rectangle is less than X2, as in the case of rectangle 802 of FIG. 8B, flow proceeds to step S1114 at which point each side of circumscribing rectangle 802 is extended until it reaches a row or column containing a black pixel. If no black pixel has been encountered by the time the side is a specified distance from frame outline 708, the side remains at its original position and the initial rectangular area is defined as resulting rectangle 804.

In the case that the area of a circumscribing rectangle is greater than a predetermined threshold value X2, as in the case of rectangle 805, flow proceeds to step S1115, wherein the initial rectangular area is defined as circumscribing rectangle 805.

The initial rectangular area defined according to the above steps is used to create an extended rectangular area which circumscribes the unattached and the attached connected components within the frame.

Thereafter, in step S1116, a detection area is defined as the entire row or column directly adjacent to one side of the initial rectangular area. For example, FIG. 9A shows detection area 901 adjacent to initial rectangular area 805.

The pixels within detection area 901 are examined in step S1117. If any black pixels exist in the detection area, flow proceeds to step S1119, at which point initial rectangular area 805 is extended to include detection area 901. For example, due to attached connected component 606, the left side of initial rectangular area 805 has been extended in FIG. 9B to include detection area 901.

Flow proceeds to step S1120, where detection area 901 is examined to determine whether any pixels in detection area 901 are also on boundary 978 of frame outline 708 lying opposite from initial rectangular area 805. If so, flow proceeds to step S1124. If not, flow proceeds to step S1121 where the detection area is redefined to be the group of pixels 902 adjacent to the previous detection area toward boundary 978 of frame outline 708, as shown in FIG. 9C. Flow then proceeds to step S1117 and continues as described above.

On the other hand, if no black pixels are detected in step S1117, flow proceeds to step S1122, at which point the distance between the detection area and boundary 970 of frame outline 700 which lies opposite from initial rectangular area 805 is compared with a predetermined distance x3. If the distance is greater than x3, flow proceeds to step S1123.

In step S1123, the detection area is redefined as described above with respect to step S1121. Flow returns to step S1117, and continues as described above.

If, in step S1122, the distance is less than or equal to distance x3, it is assumed that no connected components are attached to this side of table-cell 502 and flow proceeds to step S1124. In the case that pixels adjacent to each of the four sides of the initial rectangular area 805 have not been examined, flow reverts to step S1116, where a new detection area is defined as a row or column of pixels directly adjacent to another side of original initial rectangular area 805. If not, flow then proceeds from step S1124 to step S1125. At this point, initial rectangular area 805 has been extended to include all attached connected components within table-cell 502, as shown in FIG. 9D.

The first row 1001 of extended character area 910 is selected for analysis in step S1126. Then, in step S1127, a white contour within the frame outline 708 is selected for analysis. In step S1129, boundary pixels located in the selected row 1001 are identified. Boundary pixels are all pixels of a particular row which are on the boundary of a selected white contour. For example, pixels w1, w2, w3, and w4 of row 1002 are boundary pixels.

Next, in step S1130, the identified boundary pixels are numbered sequentially from the left end of table-cell 502. In step S1131, in the case that each white contour has been analyzed with respect to the currently selected row, flow proceeds to step S1134. If not, flow proceeds to step S1132, in which another white contour is selected. Flow then returns to step S1129, which operates as described above.

In the case that step S1130 is repeated during the analysis of a single row, any identified boundary pixels are numbered sequentially from the last number assigned to a boundary pixel in that row. For example, in the case of row 1002, boundary pixels w1, w2, w3 and w4 are identified during the analysis of white contour 610. Thereafter, two boundary pixels are identified corresponding to white contour 704. These boundary pixels are numbered w5 and w6, respectively.

As described above, step S1134 is executed if all white contours have been analyzed with respect to a single row. In step S1134, black boundary pixels are identified, which comprise black pixels of the selected row which are located on the extended rectangular area 910. For example, when row 1006 is selected, black pixel P is identified.

If all the rows or extended rectangular area 910 have not been analyzed, flow proceeds from step S1135 to S1136, in which the next row of extended rectangular area 910 is selected and flow returns to step S1127. On the other hand, if, in step S1135, the last row analyzed was the bottom row 1004 of extended rectangular area 910, flow proceeds to step S1137, and the boundary pixels of each row are analyzed. Specifically, black pixels which lie between even and odd-numbered boundary pixels of a single row are detected. As shown in FIG. 10B, black pixels are detected in row 1002 between boundary pixels w2 and w5 and between boundary pixels w6 and w3. In addition, in row 1006, black pixels between boundary pixels w2 and w3 are detected. Black pixels are detected in this manner for each row of extended rectangular area 910.

In step S1138, black pixels lying between an even-numbered boundary pixel and a black boundary pixel are detected. For example, the black pixels lying between pixel w2 of row 1001 and black boundary pixel P are detected. Similarly, in step S1138, any black pixels lying between a black boundary pixel and an odd-numbered boundary pixel are detected.

All adjacent black pixels detected in steps S1137 and S1138 are grouped together to form attached connected components in step S1139. For example, in FIG. 10B, adjacent black pixels are grouped together in order to form the attached connected component "A". Once each black pixel of each attached connected component is grouped, the attached connected components formed in step S1139 are examined to determine whether they are text components.

In step S1140, an attached connected component is examined to determine whether it is a horizontal line. Accordingly, if the height of the component is less than a predetermined threshold X4 and if the width-to-height ratio of the component is greater than a predetermined threshold X5, flow proceeds to step S1141, at which point the component is designated a horizontal line, and flow proceeds to step S1150.

If the attached connected component does not meet the criteria of step S1140, flow proceeds to S1142, in which the attached connected component is examined to determine whether it is a vertical line. Accordingly, if the width of the component is less than a predetermined threshold X6 and the height-to-width ratio of the component is greater than a predetermined threshold X7, flow proceeds to step S1144. In step S1144, the component is designated a vertical line and flow proceeds to step S1150.

Step S1145 determines whether the component is part of table-cell 502. Therefore, in step S1145, if the height or width of the component is less than a predetermined threshold X8 and the component is also entirely above, below or to either side of all text connected components within the frame, flow proceeds to step S1146, at which point the component is designated as part of the table-cell 502 and flow continues to step S1150.

In step S1147, the component is analyzed to determine if any other components are located in its row or column. If so, the column or row of components is examined as described above with respect to horizontal and vertical lines. If the row or column of components meet the criteria of either a vertical or horizontal line, the component is designated as part of a broken line in step S1148. Flow then proceeds to step S1120.

If the requirements set forth in steps S1140, S1142, S1145 or S1147 are not met, then, in step S1149, the attached connected component is assumed to be a text component. Accordingly, a node is created representing unattached text 606.

Flow then proceeds to step S1150, from which, if any attached connected components within table-cell 502 have not yet been analyzed, flow returns to step S1140. If all attached connected components have been analyzed, the flow of the present invention terminates.

It should be noted that the present invention may be incorporated into any page analysis system and is not limited to the block selection techniques described above. Furthermore, the present invention may be used to identify and extract text data attached to any circumscribing frame, regardless of whether the frame represents a cell of a table, a decorative border, etc.

While the present invention is described above with respect to what is currently considered to be the preferred embodiment, it is to be understood that the invention is not limited to the disclosed embodiment. To the contrary, the invention is intended to cover various modifications and equivalent arrangements included in the spirit and scope of the appended claims.

What is claimed is:

1. In a feature extraction system which analyzes image data in an input document and which creates a hierarchical tree structure representative of that document so as to facilitate extracting the image data, a method comprising the steps of:

a first tracing step for tracing connected components in the document;

a second tracing step for tracing white contours inside a connected component;

a first defining step for defining a frame outline based on the traced white contours;

a first identifying step for identifying unattached connected components inside the frame outline;

a second defining step for defining an initial rectangular area inside the frame outline;

an extending step for extending the initial rectangular area in a horizontal or vertical direction from the initial rectangular area within the defined frame in order to create an extended character area;

a detecting step for detecting black pixels in the extended character area, the black pixels included in at least one connected component and attached to the frame in the extended character area; and a third defining step for defining a character node of a hierarchical tree structure containing information corresponding to both the at least one connected component including the detected black pixels and any identified unattached connected components.

2. A method according to claim 1, wherein said first defining step defines a frame outline by grouping and rectangularizing the traced white contours.

3. A method according to claim 1, wherein said second defining step comprises the steps of:

defining an initial rectangular area based on unattached connected components in a case where unattached connected components are identified in said first identifying step;

defining an initial rectangular area based on the white contours in a case where no unattached connected components are identified in said first identifying step; and defining an initial rectangular area based on unattached connected components, the white contours and a distance from unattached connected components to an edge of the frame outline in a case where small unattached connected components are identified in said first identifying step, wherein said small unattached connected components have an area less than a second predetermined threshold.

4. A method according to claim 1, wherein said recognizing step recognizes the at least one connected component as a text component if 1) a height of the at least one connected component is not less than a third predetermined threshold or a width-to-height ratio of the at least one connected component is not greater than a fourth predetermined threshold, 2) a width of the at least one connected component is not less than a fifth predetermined threshold or a height-to-width ratio of the at least one connected component is not greater than a sixth predetermined threshold, 3) a width or height of the at least one connected component is greater than a seventh predetermined threshold or the at least one text component is between an unattached connected component and another unattached connected component, and 4) a group of connected components comprising the at least one connected component and other connected components in the same row or column meets 1) and 2).

5. A method according to claim 1, further comprising a recognizing step for recognizing the at least one connected component as a text component.

6. In a feature extraction system which analyzes image data in an input document and which creates a hierarchical tree structure representative of that document so as to facilitate extracting the image data, a computer-readable memory medium storing computer-executable process steps comprising:

a first tracing step to trace connected components in the document;

a second tracing step to trace white contours inside a connected component;

a first defining step to define a frame outline based on the traced white contours;

a first identifying step to identify unattached connected components inside the frame outline;

a second defining step to define an initial rectangular area inside the frame outline;

an extending step to extend the initial rectangular area in a horizontal or vertical direction from the initial rectangular area within the defined frame in order to create an extended character area;

a detecting step to detect black pixels in the extended character area, the black pixels included in at least one connected component and attached to the frame in the extended character area; and a third defining step to define a character node of a hierarchical tree structure containing information corresponding to both the at least one connected component including the detected black pixels and any identified unattached connected components.

7. A computer-readable memory medium storing computer-executable process steps according to claim 6, wherein, in said first defining step, a frame outline is defined using grouping of and rectangularization of the traced white contours.

8. A computer-readable memory medium storing computer-executable process steps according to claim 6, wherein said second defining step comprises the steps of:

a defining step to define an initial rectangular area based on unattached connected components in a case where unattached connected components are identified in said first identifying step;

a defining step to define an initial rectangular area based on the white contours in a case where no unattached connected components are identified in said first identifying step; and a defining step to define an initial rectangular area based on unattached connected components, the white contours and a distance from unattached connected components to an edge of the frame outline in a case where small unattached connected components are identified in said first identifying step, wherein said small unattached connected components have an area less than a second predetermined threshold.

9. A computer-readable memory medium storing computer-executable process steps according to claim 6, wherein, in said recognizing step, the at least one connected component is recognized as a text component if 1) a height of the at least one connected component is not less than a third predetermined threshold or a width-to-height ratio of the at least one connected component is not greater than a fourth predetermined threshold, 2) a width of the at least one connected component is not less than a fifth predetermined threshold or a height-to-width ratio of the at least one connected component is not greater than a sixth predetermined threshold, 3) a width or height of the at least one connected component is greater than a seventh predetermined threshold or the at least one text component is between an unattached connected component and another unattached connected component, and 4) a group of connected components comprising the at least one connected component and other connected components in the same row or column meets 1) and 2).

10. A computer-readable memory medium storing computer-executable process steps according to claim 6, further comprising a recognizing step to recognize the at least one connected component as a text component.

11. In a feature extraction system which analyzes image data in an input document and which creates a hierarchical tree structure representative of that document so as to facilitate extracting the image data, an apparatus for identifying and extracting a text component attached to a frame within a table image in a document, the apparatus comprising:

a memory for storing processor-executable process steps; and a processor for executing the processor-executable process steps stored in the memory to 1) trace connected components in the document, 2) trace white contours inside a connected component, 3) define a frame outline based on the traced white contours, 4) identify unattached connected components inside the frame outline, 5) define an initial rectangular area inside the frame outline, 6) extend the initial rectangular area in a horizontal or vertical direction from the initial rectangular area within the defined frame in order to create an extended character area, 7) detect black pixels in the extended character area, the black pixels included in at least one connected component and attached to the frame in the extended character area, and 8) define a character node of a hierarchical tree structure containing information corresponding to both the at least one connected component including the detected black pixels and any identified unattached connected components.

12. In a feature extraction system which analyzes image data in an input document and which creates a hierarchical tree structure representative of that document so as to facilitate extracting the image data, computer-executable process steps stored on a computer usable medium, the computer-executable process steps comprising:

code to perform a first tracing step for tracing connected components in the document;

code to perform a second tracing step for tracing white contours inside a connected component;

code to perform a first defining step for defining a frame outline based on the traced white contours;

code to perform a first identifying step for identifying unattached connected components inside the frame outline;

code to perform a second defining step for defining an initial rectangular area inside the frame outline;

code to perform an extending step for extending the initial rectangular area in a horizontal or vertical direction from the initial rectangular area within the defined frame in order to create an extended character area;

code to perform a detecting step for detecting black pixels in the extended character area, the black pixels included in at least one connected component and attached to the frame in the extended character area; and code to perform a third defining step for defining a character node of a hierarchical tree structure containing information corresponding to both the at least one connected component including the detected black pixels and any identified unattached connected components.

13. Computer-executable process steps according to claim 12, wherein said code to perform said first defining step defines a frame outline by grouping and rectangularizing the traced white contours.

14. Computer-executable process steps according to claim 12, wherein said code to perform said second defining step further comprises:

code to perform a defining step to define an initial rectangular area based on unattached connected components in a case where unattached connected components are identified in said first identifying step;

code to perform a defining step to define an initial rectangular area based on the white contours in a case where no unattached connected components are identified in said first identifying step; and code to perform a defining step to define an initial rectangular area based on unattached connected components, the white contours and a distance from unattached connected components to an edge of the frame outline in a case where small unattached connected components are identified in said first identifying step;

wherein said small unattached connected components have an area less than a second predetermined threshold.

15. Computer-executable process steps of claim 12, wherein said recognizing step recognizes the at least one connected component as a text component if 1) a height of the at least one connected component is less than a third predetermined threshold or a width-to-height ratio of the at least one connected component is not greater than a fourth predetermined threshold, 2) a width of the at last one connected component is not less than a fifth predetermined threshold or a height-to-width ratio of the at least one connected component is not greater than a sixth predetermined component 3) a width or height of the at least one connected component is greater than a seventh predetermined threshold or the at least one text component is between an unattached connected component and another unattached component, and 4) a group of connected components comprising the at least one connected component and other connected components in the same row or column meets 1) and 2).

* * * * *

UNITED STATES PATENT AND TRADEMARK OFFICE
CERTIFICATE OF CORRECTION

PATENT NO. : 6,157,738  
DATED : December 5, 2000  
INVENTOR(S) : Shin-Ywan Wang Page 1 of 1

It is certified that error appears in the above-identified patent and that said Letters Patent is hereby corrected as shown below:

Column 2,  
Line 5, "frames." should read -- frame. --.

Column 4,  
Line 45, "techniques" should read -- technique --.  
Line 59, "purpose" should read -- purposes --.

Column 5,  
Line 33, "50" should read -- 500 --.

Column 7,  
Line 11, "cide" should read -- side --.  
Line 47, "S3," should read -- X3. --.

Column 10,  
Line 44, "x3." should read -- X3. --.  
Line 50, "x3," should read -- X3, --.

Column 11,  
Line 25, "or" should read -- of --.

Signed and Sealed this

Twenty-seventh Day of November, 2001

Attest:

*Nicholas P. Godici*

NICHOLAS P. GODICI  
*Attesting Officer*   *Acting Director of the United States Patent and Trademark Office*